United States Patent
Heimbach et al.

(10) Patent No.: US 9,550,927 B2
(45) Date of Patent: Jan. 24, 2017

(54) ACRYLIC BLOCK COPOLYMERS

(71) Applicant: Avery Dennison Corporation, Glendale, CA (US)

(72) Inventors: Kyle R. Heimbach, Millmont, PA (US); Eric L. Bartholomew, Mill Hall, PA (US); Christopher L. Lester, Kingsport, TN (US); William L. Bottorf, Mill Hall, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/211,300

(22) Filed: Mar. 14, 2014

(65) Prior Publication Data

US 2014/0303314 A1 Oct. 9, 2014

Related U.S. Application Data

(60) Provisional application No. 61/792,329, filed on Mar. 15, 2013.

(51) Int. Cl.
*C09J 153/00* (2006.01)
*C08F 2/38* (2006.01)
*C08F 293/00* (2006.01)

(52) U.S. Cl.
CPC .......... *C09J 153/00* (2013.01); *C08F 2/38* (2013.01); *C08F 293/005* (2013.01); *C08F 2438/02* (2013.01); *C08F 2438/03* (2013.01)

(58) Field of Classification Search
CPC ........ C09J 153/00; C08F 2/38; C08F 293/005; C08F 2438/02; C08F 2438/03
USPC .................. 524/554, 556, 561; 525/289, 299
See application file for complete search history.

(56) References Cited

U.S. PATENT DOCUMENTS

| | | | |
|---|---|---|---|
| 3,239,478 A | 3/1966 | Harlan, Jr. | |
| 3,639,517 A | 2/1972 | Kitchen et al. | |
| 3,932,328 A | 1/1976 | Korpman | |
| 4,156,434 A | 5/1979 | Miller | |
| 4,221,884 A | 9/1980 | Bi et al. | |
| 4,418,120 A | 11/1983 | Kealy et al. | |
| 4,444,953 A | 4/1984 | St. Clair | |
| 4,554,324 A | 11/1985 | Husman et al. | |
| 4,556,464 A | 12/1985 | St. Clair | |
| 4,780,367 A | 10/1988 | Lau et al. | |
| 5,006,582 A | 4/1991 | Mancinelli | |
| 5,098,959 A | 3/1992 | McGrath et al. | |
| 5,264,527 A | 11/1993 | Varshney et al. | |
| 5,296,547 A | 3/1994 | Nestegard et al. | |
| 5,395,884 A | 3/1995 | Gnanou | |
| 5,403,658 A | 4/1995 | Southwick et al. | |
| 5,677,387 A | 10/1997 | Bayard et al. | |
| 5,686,534 A | 11/1997 | Bayard et al. | |
| 5,773,506 A | 6/1998 | Nestegard et al. | |
| 5,798,421 A | 8/1998 | Boutevin | |
| 5,866,112 A | 2/1999 | Jones et al. | |
| 5,919,867 A | 7/1999 | Yasuda et al. | |
| 6,114,482 A | 9/2000 | Senninger et al. | |
| 6,302,982 B1 * | 10/2001 | Corey | B29C 66/437 156/193 |
| 6,551,704 B2 | 4/2003 | Himmelsbach et al. | |
| 6,652,963 B2 | 11/2003 | Husemann et al. | |
| 6,703,441 B2 | 3/2004 | Husemann et al. | |
| 6,723,407 B2 | 4/2004 | Dollase et al. | |
| 6,723,786 B2 | 4/2004 | Husemann et al. | |
| 6,734,256 B1 | 5/2004 | Everaerts et al. | |
| 6,806,320 B2 | 10/2004 | Everaerts et al. | |
| 6,878,775 B2 | 4/2005 | Husemann et al. | |
| 7,056,983 B2 | 6/2006 | Nakagawa et al. | |
| 7,084,209 B2 | 8/2006 | Everaerts et al. | |
| 7,494,708 B2 | 2/2009 | Everaerts et al. | |
| 7,714,052 B2 | 5/2010 | Paul et al. | |
| 2004/0006151 A1 | 1/2004 | Husemann et al. | |
| 2005/0090592 A1 | 4/2005 | Husemann et al. | |
| 2005/0187346 A1 | 8/2005 | Husemann et al. | |
| 2006/0154098 A1 | 7/2006 | Dollase et al. | |
| 2011/0207871 A1 * | 8/2011 | Geurts | C08F 2/18 524/458 |
| 2013/0059971 A1 * | 3/2013 | Miller | C08F 293/005 524/553 |

FOREIGN PATENT DOCUMENTS

| | | |
|---|---|---|
| CN | 1145051 | 3/1997 |
| EP | 0479311 | 4/1992 |
| EP | 0286376 | 3/1993 |
| EP | 0349232 | 5/1993 |
| EP | 0349270 | 8/1994 |
| EP | 0921170 | 6/1999 |
| JP | 1989024879 | 1/1989 |
| JP | 1997324165 | 12/1997 |
| JP | 10-008011 | 1/1998 |
| JP | 10-008012 | 1/1998 |
| JP | 10-008013 | 1/1998 |
| JP | 10-025459 | 1/1998 |
| JP | 10-025460 | 1/1998 |

(Continued)

OTHER PUBLICATIONS

International Search Report issued in corresponding IA No. PCT/US2014/027489 dated Jul. 7, 2014.
International Preliminary Report on Patentability issued in corresponding IA No. PCT/US2014/027489 dated Sep. 24, 2015.
www.pstc.org/files/public/101.pdf—p. 101-2, Item 10 Test Method A—Single-Coated Tapes at 180° Angle and p. 101-7, item 17.1.8.

*Primary Examiner* — Michael M Bernshteyn
(74) *Attorney, Agent, or Firm* — Avery Dennison Corporation (57) ABSTRACT

Acrylic block copolymers are described which are inherently tacky. Also described are compositions of the copolymers which exhibit properties enabling their use as pressure sensitive adhesives, without addition of tackifiers and/or subsequent processing.

25 Claims, 3 Drawing Sheets

(56) References Cited

FOREIGN PATENT DOCUMENTS

| | | |
|---|---|---|
| JP | 10-030078 | 2/1998 |
| JP | 10-298248 | 11/1998 |
| JP | 11-302617 | 11/1999 |
| JP | 11-323072 | 11/1999 |
| WO | 95/24310 | 9/1995 |
| WO | 97/18247 | 5/1997 |
| WO | 98/01478 | 1/1998 |
| WO | 99/06453 | 2/1999 |
| WO | WO 2007140192 A2 * 12/2007 | ............... A61K 8/90 |
| WO | 2009/016239 | 2/2009 |
| WO | 2011/146450 | 11/2011 |

\* cited by examiner

ACRYLIC BLOCK COPOLYMERS

CROSS REFERENCE TO RELATED APPLICATION

The present application claims the benefit of U.S. Provisional Application No. 61/792,329 filed Mar. 15, 2013, which is incorporated herein by reference in its entirety.

FIELD

The present subject matter relates to acrylic block copolymers which are inherently tacky and/or exhibit pressure sensitive adhesive properties without subsequent processing and/or addition of tackifiers.

BACKGROUND

Pressure sensitive adhesives are well known in the art and can be based upon various polymeric components. Typically, pressure sensitive adhesives are rendered tacky by incorporation of one or more tackifiers into the adhesive and/or by subsequent processing of the adhesive components.

Although satisfactory in many respects; expenditures of material costs, time, and effort are typically associated with producing a pressure sensitive adhesive from its underlying adhesive components. Accordingly, it would be desirable to produce a pressure sensitive adhesive while reducing and ideally eliminating the attendant costs and burdens typically associated with producing such adhesives.

SUMMARY

In one aspect, the present subject matter provides an acrylic block copolymer comprising at least one A block and at least one B block. The copolymer is inherently tacky.

In another aspect, the present subject matter provides a pressure sensitive adhesive composition comprising an acrylic block copolymer including at least one A block and at least one B block. The copolymer is inherently tacky. In certain versions of the present subject matter, the compositions are free of tackifiers yet exhibit pressure sensitive adhesive characteristics.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides acrylic block copolymers which are inherently tacky. Compositions comprising such copolymers exhibit pressure sensitive adhesive characteristics without any subsequent processing of the composition and/or without the addition of tackifiers. Thus, in many versions of the present subject matter, the acrylic block copolymers can be used as pressure sensitive adhesives after their formation, without subsequent processing and/or incorporation of tackifiers. As is well known in the adhesive field, pressure sensitive adhesives are typically produced by incorporating one or more tackifiers into the composition. Non-limiting examples of tackifiers include rosins and their derivatives (e.g., rosin esters), polyterpenes and modified polyterpene resins, hydrogenated terpene resins, cumarone-indene resins, and hydrocarbon resins (e.g., resins derived from alpha-pinene, beta-pinene, limonene, aliphatic hydrocarbons, aromatic hydrocarbons, and dicyclopentadiene).

In particular versions of the present subject matter, compositions of the acrylic block copolymers are provided which are free of tackifiers and yet which are inherently tacky and/or exhibit pressure sensitive adhesive characteristics.

The acrylic block copolymers of the present subject matter can be produced using a variety of different processes and strategies. Details as to several particular techniques are set forth below followed by a description of additional details of acrylic block copolymers according to certain aspects of the present subject matter.

Chain growth polymerization has been successfully performed for many decades through conventional free radical, anionic, or cationic polymerization. These polymerization techniques generate many important commodity polymers in which their broad range of molecular weight distribution gives rise to important physical properties. While these techniques are useful for a number of applications starting from a wide variety of monomers, several applications benefit from using more precisely controlled polymers. "Living" polymerization enables control over the polymer architecture, which includes molecular weight, molecular weight distribution (polydispersity), functionality, and composition. In living polymerization strategies, the occurrence of premature termination is minimized, and molecular weight proceeds linearly with time until all monomer is consumed or intentionally terminated.

More recently, methods have been developed based upon an adaptation of living ionic polymerization to living radical polymerization also referred to as controlled free radical polymerization. Controlled free radical polymerization includes three fundamental techniques as follows: Atom Transfer Radical Polymerization (ATRP); Reversible Addition/Fragmentation Chain Transfer Polymerization (RAFT); and Nitroxide-mediated Polymerization (NMP). This technique is also known as Stable Free Radical Polymerization (SFRP).

In certain versions of the present subject matter, RAFT and SFRP polymerization techniques are used for forming acrylic block copolymers. Details of the these syntheses are provided herein. Before turning attention to these polymerization techniques, it is instructive to consider certain aspects of block copolymers.

Block copolymers, whether they are acrylic or olefin based, are inherently nontacky in pure form. Traditional and commercially available triblocks are pure ABA type phase separated polymers without pressure sensitive properties. They require additives such as tackifiers, antioxidants, oils/plasticizers to become pressure sensitive adhesives. These types of ABA copolymers are known in the art and can be expressed as: AAAAAAAAAAABBBBBBBBBBBBBBB-BAAAAAAAAAA, for example.

In contrast, the copolymers of the present subject matter typically have a backbone structure in which there is no distinct demarcation between blocks formed from A monomers and blocks formed from B monomers. Instead, A blocks may include a minority proportion of B monomers, and B blocks may include a minority proportion of A monomers. Another characteristic of the copolymers of the present subject matter is that they typically include a transition region between A blocks and B blocks in which the population or occurrence of an A or B monomer increases or decreases, analogous to a gradient. For example, a copolymer of the present subject matter may have a backbone structure as follows:

AAAAAAAAAABBABBABABABBBBBBBBBBBA-BABABABAAAAAABAAAAAAA

The backbone structure of the present subject matter copolymers typically imparts a gradient to polymeric compositions such as pressure sensitive adhesives utilizing such copolymers.

In certain versions of the present subject matter, these characteristics enable compositions to be phase separated, and inherently exhibit pressure sensitive properties without any additives incorporated in the compositions. The compositions of the present subject matter are receptive to additives, but such additives are not required to achieve pressure sensitive properties.

One well known means of identifying pressure sensitive adhesives (PSAs) is the Dahlquist criterion. This criterion defines a PSA as an adhesive having a 1 second creep compliance of greater than $1\times10^{-6}$ cm$^2$/dyne as described in *Handbook of PSA Technology*, Donatas Satas (Ed.), 2$^{nd}$ Edition, p. 172, Van Nostrand Reinhold, New York, N.Y., 1989. Alternatively, since modulus is, to a first approximation, the inverse of creep compliance, PSAs may be defined as adhesives having a Young's modulus of less than $1\times10^6$ dynes/cm$^2$. Another well known means of identifying a PSA is that it is aggressively and permanently tacky at room temperature and firmly adheres to a variety of dissimilar surfaces upon mere contact without the need of more than finger or hand pressure, and which may be removed from smooth surfaces without leaving residue as described in *Glossary of Terms Used in the Pressure Sensitive Tape Industry*, provided by the Pressure Sensitive Tape Council, 1996. Another definition of a suitable PSA is that it preferably has a room temperature storage modulus within the area defined by the following points as plotted on a graph of modulus versus frequency at 25° C.: a range of moduli from approximately $2\times10^5$ to $4\times10^5$ dynes/cm$^2$ at a frequency of approximately 0.1 radians/sec (0.017 Hz), and a range of moduli from approximately $2\times10^6$ to $8\times10^6$ dynes/cm$^2$ at a frequency of approximately 100 radians/sec (17 Hz) (for example see FIG. 8-16 on p. 173 of *Handbook of PSA Technology* (Donatas Satas, Ed.), 2$^{nd}$ Edition, Van Nostrand Rheinhold, New York, 1989). Any of these methods of identifying a PSA may be used to identify suitable PSAs for use in accordance with the present subject matter.

In certain embodiments of the present subject matter, the end blocks of the polymer will constitute from about 5% to about 60% and more particularly from about 10% to about 50% of the total molecular weight of the polymer. The number of chain ends will depend upon the configuration of each resulting polymer, i.e., diblock, triblock, star, etc. The midblock will generally constitute from about 40% to about 95% and more particularly from about 50% to about 90% of the total molecular weight of the polymer.

In certain embodiments, polymers of the present subject matter are inherently tacky and can be used as pressure sensitive adhesives without further additives.

In certain embodiments, polymers of the present subject matter exhibit water white resistance or haze as compared to traditional poly(styrene-isoprene-styrene) (SIS), poly(styrene-butadiene-styrene) (SBS), and olefin block copolymers, primarily due to the present polymers being acrylic. Additionally, certain versions of the present subject matter polymers exhibit superior oil and/or chemical resistance and film clarity as compared to corresponding acrylic polymers produced by conventional techniques.

In certain embodiments, the polymers of the present subject matter have a molecular weight in a range of from about 25,000 to about 500,000, and more particularly from about 50,000 to about 200,000.

In certain embodiments of the present subject matter, the polymers of the present subject matter exhibit a polydispersity index (PDI) in a range of from about 1 to about 4, and more particularly from about 1.3 to about 3.

In certain versions of the present subject matter, acrylic block copolymers include an acrylate midblock, e.g., an A block or a B block, and two or more acrylate endblocks, e.g., the other of the A block or the B block. The midblock comprises at least one acrylate midblock monomer. And, each endblock comprises at least two acrylate endblock monomers. Throughout this specification and claims, the terms "acrylic" and "acrylate" are used generally to include derivatives of acrylic acids as well as substituted acrylic acids such as methacrylic acid, ethacrylic acid, etc., unless clearly indicated otherwise. The term "acrylate" is intended to include substituted as well as unsubstituted acrylates. In particular, the term "acrylate" is intended to include alkyl acrylates and other acrylates containing from 1 up to 8 carbon atoms. In certain versions of the present subject matter, it is contemplated that the copolymers may include alkyl acrylates having more than 8 carbon atoms. It is contemplated that a wide array of acrylate monomers could be used. Specific examples of mono- and polyfunctional acrylate monomers which can be utilized as a reactive material include one or more of the following: ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; isobornyl acrylate; caprolactone acrylate; 2-phenoxyethyl acrylate; benzyl acrylate; monomethyoxy tripropylene glycol monoacrylate; monomethoxy neopentyl glycol propoxylate monoacrylate; 1,3-butanediol diacrylate; 1,4 butanediol diacrylate; 1,6-hexanedioldiacrylate; trimethylolpropane triacrylate; glyceryl triacrylate; pentaerythritol triacrylate; pentaerythritoltetraacrylate; dipentaerythritol pentaacrylate; di-trimethylolpropane tetraacrylate; tris(2-hydroxyethyl)isocyanurate triacrylate, tetrahydrofurfuryl acrylate; isooctyl acrylate; isodecyl acrylate; 2-(2-ethoxyethoxy) ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate and combinations thereof. In certain versions of the present subject matter, it is beneficial to use one or more of the following acrylate monomers: isobornyl acrylate, n-butyl acrylate, t-butyl acrylate, methyl (meth)acrylate, tripropylene glycol diacrylate, and combinations thereof.

In certain embodiments of the present subject matter, the acrylic block copolymers are synthesized using particular extents of monomer conversion. Although not wishing to be bound to any particular theory, it is believed that use of certain syntheses in conjunction with particular extents of monomer conversion leads to unique gradiency properties in the resulting copolymers. In one aspect of the present subject matter, copolymers can be formed having beneficial properties at a monomer conversion extent of about 80% to about 95%, and more particularly about 90%. A monomer conversion of 90% refers to 90% of a first population of monomers being converted to a corresponding block, such as an A block or a B block, with the remaining 10% monomers being distributed within the other block, e.g., A block or B block.

Thus, an A block (or B block) can contain a minority proportion of monomers forming a B block (or A block), and vice versa. The distribution of the minority proportion of monomers in a block of another monomer type is typically not uniform, but instead varies along the length or backbone of the block. In certain embodiments of the present subject matter, the concentration or population of one type of monomer within a block of another monomer is higher at or near the ends or terminal regions of the block. However, it will be understood that the present subject matter includes a wide array of arrangements and monomer distribution(s) and is not limited to the previously described scenario.

Although the present subject matter compositions have been described as being free of tackifiers, it will be understood that the present subject matter also includes compositions that include tackifiers. The present subject matter compositions may also comprise a wide array of other components and/or additives. The compositions can comprise a plasticizer. In some embodiments, the composition comprises one plasticizer. In other embodiments, the composition comprises more than one plasticizer. Non-limiting examples of plasticizers include hydrocarbons (e.g., aromatics, paraffinics, or naphthenics), phthalates, phosphate esters, dibasic add esters, fatty add esters, polyethers, and combinations thereof. In some embodiments, the composition comprises at least one phosphate ester, phthalate, or dibasic acid ester. The compositions can comprise either or both a tackifier or plasticizer.

In certain embodiments of the present subject matter, one or more additives may be incorporated in the compositions. Instead or, or in addition to tackifiers and/or plasticizers, the compositions may also include oils, processing aids, antioxidants, stabilizers, fillers, dyes, pigments, rheological additives, and combinations thereof.

The following description provides additional details relating to Reversible Addition/Fragmentation Chain Transfer Polymerization (RAFT) polymerization and Stable Free Radical Polymerization (SFRP) (also known as NMP) methods. Although these methods are described herein, it will be appreciated that the present subject matter includes other techniques and methods for forming inherently tacky acrylic block copolymers.

Reversible Addition/Fragmentation Chain Transfer Polymerization (RAFT)

RAFT or Reversible Addition/Fragmentation Chain Transfer is a form of living radical polymerization. RAFT polymerization allows synthetic tailoring of macromolecules with complex architectures including block, graft, comb, and star structures with controlled molecular weight. RAFT polymerization is applicable to a very wide range of monomers under a variety of conditions.

The RAFT process involves conventional free radical polymerization of a substituted monomer in the presence of a suitable chain transfer agent (RAFT agent or other chain transfer agent). Commonly used RAFT agents include thiocarbonylthio compounds such as dithioesters, dithiocarbamates, trithiocarbonates, and xanthates, which mediate the polymerization via a reversible chain transfer process. Use of a proper RAFT agent allows synthesis of polymers with a high degree of functionality and narrow distribution of molecular weights also referred to as a low polydispersity index (PDI).

A RAFT chain transfer agent typically has a thiocarbonylthio group, S=C—S with substituents R and Z that impact the polymerization reaction kinetics and therefore, the degree of structural control. Initiation of the polymerization reaction is accomplished utilizing conventional thermal, photochemical, or redox methods, and the success of the RAFT polymerization is dependent upon selecting the appropriate RAFT reagent for a particular monomer and reaction medium.

Stable Free Radical Polymerization (SFRP)

The mechanism of SFRP involves an equilibrium between nitroxide-capped polymer chains and uncapped polymer chains. The success of SFRP depends upon the retention of a suitable amount of free nitroxide in the reaction to keep the propagating polymer radical chains at a concentration which allows the polymerization to proceed at a sufficient rate but avoids bimolecular termination by coupling.

Methods of Present Subject Matter

In certain embodiments, the copolymers of the present subject matter can be formed via a RAFT method, or by one of several variants of an SFRP method. Details of these strategies are set forth below and in the accompanying examples.

In one aspect, the present subject matter provides a method of forming an acrylic block copolymer that includes an acrylate midblock comprising at least one acrylate midblock monomer and at least two acrylate endblocks each endblock comprising at least two acrylate endblock monomers. The method comprises providing in a reaction vessel, at least one acrylate midblock monomer, at least one acrylate endblock monomer, and an initiator and controller nitroxide agent. The method also comprises generating an acrylate functional nitroxide agent. The method additionally comprises reacting the acrylate functional nitroxide agent with the at least two acrylate endblock monomers to thereby form an intermediate product. The method also comprises reacting the intermediate product with at least one acrylate midblock monomer to thereby form the acrylate midblock. And, the method further comprises reacting the acrylate midblock with the at least two acrylate endblock monomers to thereby form the acrylic block copolymer.

The copolymers can be formed in several different ways using the two controlled free radical polymerization methods, RAFT and SFRP (NMP). Specifically, the various syntheses strategies are referred to herein as syntheses embodiments A-E. Synthesis strategy embodiment A employs a RAFT technique. Synthesis strategy embodiment B employs a SFRP technique using SFRP agents. Synthesis strategy embodiment C uses a SFRP technique in which a diblock is polymerized from an SFRP agent and then coupled using diacrylates at the end of the polymerization. Synthesis strategy embodiment D uses a SFRP technique in which triblocks are polymerized using a custom difunctional SFRP agent. And, synthesis strategy embodiment E utilizes a SFRP technique in which diblocks are polymerized and chains are coupled by post addition of acid crosslinkers. These various syntheses are summarized below.

In the syntheses that utilize an SFRP agent, in particular versions of the present subject matter it may be beneficial to use an initiator and controller nitroxide agent. An example of such an agent is BlocBuilder® which is commercially available from Arkema. BlocBuilder® is 3,7-dioxa-4-aza- 6-phosphanonanoic acid, 4,5-bis(1,1-dimethylethyl)-6-ethoxy-2,2-dimethyl-, 6-oxide (CAS 654636-62-1). However, it will be appreciated that the present subject matter includes the use of other SFRP agents.

Embodiment A

Using RAFT

This mechanism provides enhanced blocking efficiency. This mechanism also enables formation of copolymers having a structure that approaches a true ABA structure due to its difunctionality. The RAFT chemistry enables building the outerblocks or endblocks first and then progressing toward the midblock (i.e., outside in). A yellow color may sometimes be associated with the reaction products and unpleasant odors may also be associated with RAFT chemistry.

Embodiment B

Using SFRP from Blocbuilder®

Examples 1-5 utilize this process in which each block is polymerized one at a time.

Embodiment C

Using SFRP from Blocbuilder® Using Diacrylates

Examples 6, 7, and 8 utilize this process. Supporting data shows the analytical analysis of the same ABA structures made via embodiments B and C.

Embodiment D

Using SFRP from Custom Agents

This process is similar to embodiment C except that the diacrylate is added at the beginning of the polymerization to form a custom difunctional SFRP agent. From there the midblocks are polymerized first and then the outerblocks are polymerized. Chain growth is from inside out, which is generally opposite of RAFT. Traditionally this is how triblocks are made via SFRP. A number of side products may be generated in the initial step of making the custom difunctional SFRP agent. This may result in a mixture of triblocks, diblocks, coupled triblocks, etc.

Embodiment E

Using SFRP and Post Addition of Crosslinkers

This process polymerizes the diblock, the same as Embodiment C, except that the diblocks are coupled by post-addition of a crosslinker that reacts with the end terminated acid group on each chain.

In certain versions of the present subject matter, the block copolymers include three (3) blocks. Of the three blocks, two blocks exhibit relatively high glass transition temperatures (Tg's) and are located at the ends of the polymer chains, and thus are end blocks. The middle block, or midblock, includes low Tg monomers which phase separate from the high Tg endlocks. The phase separation gives the polymer its cohesive and tensile strength. Regardless of the strategies to make the block copolymers, each block is made separately. Which block is made first is dependent on the mechanism as the chain growth is different for any given mechanism. For example, RAFT (embodiment A) grows the chains outside in, meaning it polymerizes the end blocks first and the midblock second. In contrast, SFRP (embodiment B) will grow the chain from one end to the other, meaning it polymerizes one of the end blocks first, then the midblock second, and the other end block last. SFRP polymerizes whatever monomer is present when the polymerization is active. The gradient process for embodiment C (Examples 6, 7, and 8) is as follows. This process starts by making the high Tg end blocks. The nitroxide controlling agent is reacted with the monomers that upon polymerization, constitute the end block. These monomers are reacted until 90% of them are converted to polymer. The conversion is monitored or tracked by Gas Chromatography. This leaves 10% of residual monomers that will be drifted into the next block to be made. At the point of 90% end block monomer conversion, the midblock monomers are starting to be added and are being converted into polymer. The residual 10% of end block monomers are converted to polymer while the midblock monomers are converting as well. By the time all of the midblock monomers are added to the polymerization, all of the residual end block monomers are converted to polymer. This leaves nothing but the midblock monomers to be converted into polymer. Thus the final structure looks like BBBBBBBBABABABAAABAAAAAAAA where B is the end block monomers and A is the midblock monomers. Once the midblock monomers are 90-95% converted into polymer, the coupling step is performed with a multifunctional acrylate in which the polymers are combined at the midblock chain ends. This produces a triblock structure in which 10% of the end block monomers are incorporated in the midblock:

BBBBBBBBABABABAAABAAAAAAAA-diacrylate-AAAAAAABAAABABABABBBBBBBBBBB

The amount of drift can be controlled by introducing the midblock monomers at certain points or extents of end block monomer conversion. For example, the midblock monomers could be added at 80% end block monomer conversion thus creating a triblock with 20% gradiency rather than 10%.

EXAMPLES

A series of evaluations were performed to assess the various syntheses techniques and the copolymers produced therefrom.

The monomers used in the following examples are set forth below in Table 1:

TABLE 1

| Monomer Components | | |
|---|---|---|
| Monomer | Acronym | CAS Number |
| Isobornyl Acrylate | IBOA | 5888-33-5 |
| n-Butyl Acrylate | BA | 141-32-2 |
| tert-Butyl Acrylate | tBA | 1663-39-4 |
| Methyl (Meth)Acrylate | MMA | 80-62-6 |
| Tripropylene Glycol Diacrylate | TPGDA | 42978-66-5 |

Example 1

Synthesis of Polymer Sample 1

Triblock (70/30) Using SFRP Agent

An acrylic block copolymer is prepared as follows. Into a 1500 ml reactor equipped with a heating jacket, agitator, reflux condenser, feed tanks and nitrogen gas inlet there is charged 3.80 g of Blocbuilder®. Monomers and solvent are added to a feed vessel in the following amounts:

26.15 g of IBOA
153.23 g of Butyl Acetate

The Blocbuilder® in the reactor and the monomers and solvent in the feed vessel are sparged with a constant nitrogen purge of at least 0.5 L/min for 30 minutes at room temperature. After the sparge, the monomer and solvent mix is fed to the reactor to generate a small portion of acrylate functional Blocbuilder®. The reactor charge mixture then is heated to greater than 70° C. (reactor jacket 80° C.) and held for 30 min. During the acrylation step, the following monomer amounts are added to the feed vessel and sparged with a constant nitrogen purge of at least 0.5 L/min:

26.15 g of IBOA
97.13 g of MMA

After the acrylation step, the kettle charge is heated to 90° C. (reaction temperature). When the reactor mix reaches 90° C., T=0 is set. At this point, the MMA/IBOA feed is started at 1.2 g/min. Upon completion of the MMA/IBOA feed (approximately 120 minutes), a sample is taken for Gas Chromatography Analysis to check for monomer conversion. After monomer conversion is confirmed, the reactor mix is held at a temperature between 90° C. and 95° C. until the MMA/IBOA mix is >90% converted. During the IBOA/MMA conversion time period, 697.34 g of BA is added to the feed vessel and sparged with a constant nitrogen purge of at least 0.5 L/min. After the MMA/IBOA mix is >90% converted, the kettle charge is heated to >100° C. (jacket to 120° C.) in which at 100° C. the BA feed is started at 1 g/min for 20 minutes. The feed rate is increased 1 g/min every 20 min until 3 g/min is achieved (60 min from start of feed). After the 60 minutes of feed rate ramps, the feed rate is ramped to 6 g/min for 30 minutes. After that 30 minute feed rate, the feed rate is set to 10 g/min until completion of the feed. The BA feed ends up being approximately 130 minutes. The reaction temperature is held between 105-115° C. during the feed in which the feed rate ramp acts as a coolant during the polymerization. After the BA feed is complete, the kettle charge is held between 115-120° C. until the BA conversion is >90%. During this BA conversion time period, the final end block monomers are added to the feed vessel in the following amounts:

52.30 g IBOA
97.13 g MMA

The final end block feed is sparged with a constant nitrogen purge of at least 0.5 L/min until the kettle charge BA conversion is >90%. At this point, the reaction temperature is lowered to 95° C. and the MMA/IBOA feed is started at 1.2 g/min. The feed rate is held constant until the feed is complete (approximately 120 minutes). The reaction temperature is held between 90-95° C. during the end block feed. After completion of the feed, the reaction is held between 90-95° C. until the MMA/IBOA conversion is >98%.

The resulting solution polymer is then cooled to ambient temperature and discharged from the reactor. The total theoretical Mn of the polymer is 100,000 g/mol. The "soft" middle segment is 70,000 g/mol and the "hard" end segments are 15,000 g/mol each.

The measured molecular weight (Mn) of the total acrylic polymer is 68576 g/Mole (determined by gel permeation chromatography relative to polystyrene standards) and the polydispersity is 2.13.

Example 2

Synthesis of Polymer Sample 2

Triblock (70/30) Using SFRP Agent

An acrylic block copolymer is prepared as follows. Into a 1500 ml reactor equipped with a heating jacket, agitator, reflux condenser, feed tanks and nitrogen gas inlet there is charged 5.72 g of Blocbuilder®. Monomers and solvent are added to a feed vessel in the following amounts:

28.13 g of tBA
60.00 g of Butyl Acetate

The Blocbuilder® in the reactor and the monomers and solvent in the feed vessel are sparged with a constant nitrogen purge of at least 0.5 L/min for 30 minutes at room temperature. After the sparge, the monomer and solvent mix is fed to the reactor to generate a small portion of acrylate functional Blocbuilder®. The reactor charge mixture then is heated to greater than 70° C. (reactor jacket 80° C.) and held for 30 min. During the acrylation step, the following monomer amounts are added to the feed vessel and sparged with a constant nitrogen purge of at least 0.5 L/min:

28.13 g of tBA
168.75 g of MMA

After the acrylation step, the kettle charge is heated to 90° C. (reaction temperature). When the reactor mix reaches 90° C., T=0 is set. At this point, the MMA/tBA feed is started at 1.10 g/min. Upon competition of the MMA/tBA feed (approximately 180 minutes), a sample is taken for Gas Chromatography Analysis to check for monomer conversion. After monomer conversion is confirmed, the reactor mix is held at a temperature between 90° C. and 95° C. until the MMA/tBA mix is >90% converted. During the tBA/MMA conversion time period, 1050.00 g of BA and 250.00 g BuAc is added to the feed vessel and sparged with a constant nitrogen purge of at least 0.5 L/min. After the MMA/tBA mix is >90% converted, the kettle charge is heated to >100° C. (jacket to 120° C.) in which at 100° C. the BA feed is started at 5 g/min for 330 minutes. The reaction temperature is held between 105-115° C. during the feed in which the feed rate ramp acts as a coolant during the polymerization. After the BA feed is complete, the kettle charge is held between 105-115° C. until the BA conversion is >90%. During this BA conversion time period, the final end block monomers are added to the feed vessel in the following amounts:

56.25 g tBA
168.75 g MMA
192.00 g BuAc

The final end block feed is sparged with a constant nitrogen purge of at least 0.5 L/min until the kettle charge BA conversion is >90%. At this point, the reaction temperature is lowered to 95° C. and the MMA/tBA feed is started at 2.30 g/min. The feed rate is held constant until the feed is complete (approximately 180 minutes). The reaction temperature is held between 95-100° C. during the end block feed. After completion of the feed, the reaction is held between 95-100° C. until the MMA/tBA conversion is >98%.

The resulting solution polymer is then cooled to ambient temperature and discharged from the reactor. The total theoretical Mn of the polymer is 100,000 g/mol. The "soft" middle segment is 70,000 g/mol and the "hard" end segments are 15,000 g/mol each.

The measured molecular weight (Mn) of the total acrylic polymer is 76887 g/Mole (determined by gel permeation chromatography relative to polystyrene standards) and the polydispersity is 1.92.

Example 3

Synthesis of Polymer Sample 3

Diblock (50/50) Using SFRP Agent

An acrylic block copolymer is prepared as follows. Into a 1500 ml reactor equipped with a heating jacket, agitator, reflux condenser, feed tanks and nitrogen gas inlet there is charged 2.36 g of Blocbuilder®. Monomers and solvent are added to a feed vessel in the following amounts:

6.19 g of MMA 123.82 g of Methanol

The Blocbuilder® in the reactor and the monomers and solvent in the feed vessel are sparged with a constant nitrogen purge of at least 0.5 L/min for 30 minutes at room temperature. After the sparge, the monomer and solvent mix is fed to the reactor. The reactor charge mixture is held at room temperature for 30 min. During the room temperature hold, the following monomer amounts are added to the feed vessel and sparged with a constant nitrogen purge of at least 0.5 L/min:

117.63 g of MMA

After the room temperature hold, the kettle charge is heated to 30° C. (reaction temperature). When the reactor mix reaches 30° C., T=0 is set. At this point, the MMA feed is started at 1.0 g/min. Upon completion of the MMA feed (approximately 120 minutes), a sample is taken for Gas Chromatography Analysis to check for monomer conversion. After monomer conversion is confirmed, the reactor mix is held at a temperature between 30° C. and 35° C. until the MMA is >90% converted. During the MMA conversion time period, 123.82 g of BA and 123.82 g of Butyl Acetate is added to the feed vessel and sparged with a constant nitrogen purge of at least 0.5 L/min. After the MMA is >90% converted, the BA/BuAc mix is fed over to the reactor at max feed rate (10 g/min) and the kettle charge is heated to >70° C. (jacket to 80° C.). The reaction is held between 70-75° C. for 60 minutes to add an acrylate group to the MMA-Blocbuilder® "Macromer." After the 60 minute hold, the reactor seal is broken and the reactor mix is heat to 90° C. to evaporate off the methanol so the reaction can be heated >100° C. The evaporation step was approximately 30 minutes after reaching 90° C. After the evaporation step, the reactor was sealed and sparged with a constant nitrogen purge of at least 0.5 L/min for 30 minutes. After the 30 min sparge, the kettle charge was heated to >100° C. to react the remaining BA. The reaction was held between 105-120° C. until the BA conversion was >98%.

The resulting solution polymer is then cooled to ambient temperature and discharged from the reactor. The total theoretical Mn of the polymer is 40,000 g/mol. The "soft" middle segment is 20,000 g/mol and the "hard" end segments are 20,000 g/mol each.

The measured molecular weight (Mn) of the total acrylic polymer is 26619 g/Mole (determined by gel permeation chromatography relative to polystyrene standards) and the polydispersity is 1.89.

Example 4

Synthesis of Polymer Sample 4

Triblock (60/40) Using SFRP Agent

An acrylic block copolymer is prepared as follows. Into a 1500 ml reactor equipped with a heating jacket, agitator, reflux condenser, feed tanks and nitrogen gas inlet there is charged 5.72 g of Blocbuilder®. Monomers and solvent are added to a feed vessel in the following amounts:

37.5 g of tBA 90.0 g of Butyl Acetate

The Blocbuilder® in the reactor and the monomers and solvent in the feed vessel are sparged with a constant nitrogen purge of at least 0.5 L/min for 30 minutes at room temperature. After the sparge, the monomer and solvent mix is fed to the reactor to generate a small portion of acrylate functional Blocbuilder®. The reactor charge mixture then is heated to greater than 70° C. (reactor jacket 80° C.) and held for 30 min. During the acrylation step, the following monomer amounts are added to the feed vessel and sparged with a constant nitrogen purge of at least 0.5 L/min:

37.5 g of tBA 225.0 g of MMA

After the acrylation step, the kettle charge is heated to 90° C. (reaction temperature). When the reactor mix reaches 90° C., T=0 is set. At this point, the MMA/tBA feed is started at 1.10 g/min. Upon competition of the MMA/tBA feed (approximately 180 minutes), a sample is taken for Gas Chromatography Analysis to check for monomer conversion. After monomer conversion is confirmed, the reactor mix is held at a temperature between 90° C. and 95° C. until the MMA/tBA mix is >90% converted. During the tBA/MMA conversion time period, 900.00 g of BA and 179.25 g BuAc is added to the feed vessel and sparged with a constant nitrogen purge of at least 0.5 L/min. After the MMA/tBA mix is >90% converted, the kettle charge is heated to >100° C. (jacket to 120° C.) in which at 100° C. the BA feed is started at 5 g/min for 330 minutes. The reaction temperature is held between 105-115° C. during the feed in which the feed rate ramp acts as a coolant during the polymerization. After the BA feed is complete, the kettle charge is held between 105-115° C. until the BA conversion is >90%. During this BA conversion time period, the final end block monomers are added to the feed vessel in the following amounts:

75.00 g tBA 225.00 g MMA 225.00 g BuAc

The final end block feed is sparged with a constant nitrogen purge of at least 0.5 L/min until the kettle charge BA conversion is >90%. At this point, the reaction temperature is lowered to 95° C. and the MMA/tBA feed is started at 2.30 g/min. The feed rate is held constant until the feed is complete (approximately 180 minutes). The reaction temperature is held between 95-100° C. during the end block feed. After completion of the feed, the reaction is held between 95-100° C. until the MMA/tBA conversion is >98%.

The resulting solution polymer is then cooled to ambient temperature and discharged from the reactor. The total theoretical Mn of the polymer is 100,000 g/mol. The "soft" middle segment is 60,000 g/mol and the "hard" end segments are 20,000 g/mol each.

The measured molecular weight (Mn) of the total acrylic polymer is 93427 g/Mole (determined by gel permeation chromatography relative to polystyrene standards) and the polydispersity is 1.83.

Example 5

Synthesis of Polymer Sample 5

Triblock (80/20) Using SFRP Agent

An acrylic block copolymer is prepared as follows. Into a 1500 ml reactor equipped with a heating jacket, agitator, reflux condenser, feed tanks and nitrogen gas inlet there is charged 5.72 g of Blocbuilder®. Monomers and solvent are added to a feed vessel in the following amounts:

18.75 g of tBA
75.0 g of Butyl Acetate

The Blocbuilder® in the reactor and the monomers and solvent in the feed vessel are sparged with a constant nitrogen purge of at least 0.5 L/min for 30 minutes at room temperature. After the sparge, the monomer and solvent mix is fed to the reactor to generate a small portion of acrylate functional Blocbuilder®. The reactor charge mixture then is heated to greater than 70° C. (reactor jacket 80° C.) and held for 30 min. During the acrylation step, the following monomer amounts are added to the feed vessel and sparged with a constant nitrogen purge of at least 0.5 L/min:

18.75 g of tBA
112.50 g of MMA

After the acrylation step, the kettle charge is heated to 90° C. (reaction temperature). When the reactor mix reaches 90° C., T=0 is set. At this point, the MMA/tBA feed is started at 1.10 g/min. Upon competition of the MMA/tBA feed (approximately 180 minutes), a sample is taken for Gas Chromatography Analysis to check for monomer conversion. After monomer conversion is confirmed, the reactor mix is held at a temperature between 90° C. and 95° C. until the MMA/tBA mix is >90% converted. During the tBA/MMA conversion time period, 1200 g of BA and 269.25 g BuAc is added to the feed vessel and sparged with a constant nitrogen purge of at least 0.5 L/min. After the MMA/tBA mix is >90% converted, the kettle charge is heated to >100° C. (jacket to 120° C.) in which at 100° C. the BA feed is started at 5 g/min for 330 minutes. The reaction temperature is held between 105-115° C. during the feed in which the feed rate ramp acts as a coolant during the polymerization. After the BA feed is complete, the kettle charge is held between 105-115° C. until the BA conversion is >90%. During this BA conversion time period, the final end block monomers are added to the feed vessel in the following amounts:

37.50 g tBA
112.50 g MMA
150.00 g BuAc

The final end block feed is sparged with a constant nitrogen purge of at least 0.5 L/min until the kettle charge BA conversion is >90%. At this point, the reaction temperature is lowered to 95° C. and the MMA/tBA feed is started at 2.30 g/min. The feed rate is held constant until the feed is complete (approximately 180 minutes). The reaction temperature is held between 95-100° C. during the end block feed. After completion of the feed, the reaction is held between 95-100° C. until the MMA/tBA conversion is >98%.

The resulting solution polymer is then cooled to ambient temperature and discharged from the reactor. The total theoretical Mn of the polymer is 100,000 g/mol. The "soft" middle segment is 80,000 g/mol and the "hard" end segments are 10,000 g/mol each.

The measured molecular weight (Mn) of the total acrylic polymer is 84852 g/Mole (determined by gel permeation chromatography relative to polystyrene standards) and the polydispersity is 2.21.

Example 6

Synthesis of Polymer Sample 6

Diblock (20/30) Using SFRP Agent

An acrylic block copolymer is prepared as follows. Into a 1500 ml reactor equipped with a heating jacket, agitator, reflux condenser, feed tanks and nitrogen gas inlet there is charged 11.15 g of Blocbuilder®. Monomers and solvent are added to a feed vessel in the following amounts:

73.17 g of tBA
175.62 g of Butyl Acetate

The Blocbuilder® in the reactor and the monomers and solvent in the feed vessel are sparged with a constant nitrogen purge of at least 0.5 L/min for 30 minutes at room temperature. After the sparge, the monomer and solvent mix is fed to the reactor to generate a small portion of acrylate functional Blocbuilder®. The reactor charge mixture then is heated to greater than 70° C. (reactor jacket 80° C.) and held for 30 min. During the acrylation step, the following monomer amounts are added to the feed vessel and sparged with a constant nitrogen purge of at least 0.5 L/min:

73.17 g of tBA
439.04 g of MMA

After the acrylation step, the kettle charge is heated to 90° C. (reaction temperature). When the reactor mix reaches 90° C., T=0 is set. At this point, the MMA/tBA feed is started at 2.85 g/min. Upon competition of the MMA/tBA feed approximately 180 minutes), a sample is taken for Gas Chromatography Analysis to check for monomer conversion. After monomer conversion is confirmed, the reactor mix is held at a temperature between 90° C. and 95° C. until the MMA/tBA mix is >90% converted. During the tBA/MMA conversion time period, 878.08 g of BA and 349.77 g BuAc is added to the feed vessel and sparged with a constant nitrogen purge of at least 0.5 L/min. After the MMA/tBA mix is >90% converted, the kettle charge is heated to >100° C. (jacket to 120° C.) in which at 100° C. the BA feed is started at 9.44 g/min for approximately 130 minutes. The reaction temperature is held between 105-120° C. during the feed in which the feed rate ramp acts as a coolant during the polymerization. After the BA feed is complete, the kettle charge is held between 110-120° C. until the BA conversion is 90-95%.

The resulting solution polymer is then cooled to ambient temperature and discharged from the reactor. The total theoretical Mn of the polymer is 50,000 g/mol. The "soft" segment is 30,000 g/mol and the "hard" end segment is 20,000 g/mol.

The measured molecular weight (Mn) of the total acrylic polymer is 44659 g/Mole (determined by gel permeation chromatography relative to polystyrene standards) and the polydispersity is 1.91.

Example 7

Synthesis of Polymer Sample 7

Triblock (60/40) Using SFRP Agent and Diacrylate Coupling Reaction at Back End (2:1 mol Ratio)

An acrylic block copolymer is prepared as follows. Into a 1500 ml reactor equipped with a heating jacket, agitator, reflux condenser, feed tanks and nitrogen gas inlet there is charged 242.51 g of Sample 6 and 0.373 g of Sartomer 306HP.

The reactor is sparged with a constant nitrogen purge of at least 0.5 L/min for 30 minutes at room temperature. After the sparge, the kettle charge is heated to >100° C. (jacket to 120° C.). The kettle charge is held between 105-120° C. until the BA conversion is >98%.

The resulting solution polymer is then cooled to ambient temperature and discharged from the reactor. The total theoretical Mn of the polymer is 100,000 g/mol. The "soft" middle segment is 60,000 g/mol and the "hard" end segments are 40,000 g/mol each.

The measured molecular weight (Mn) of the total acrylic polymer is 37319 g/Mole (determined by gel permeation chromatography relative to polystyrene standards) and the polydispersity is 2.54.

Example 8

Synthesis of Polymer Sample 8

Triblock (60/40) Using SFRP Agent and Diacrylate Coupling Reaction at Back End (1:1 mol Ratio)

An acrylic block copolymer is prepared as follows. Into a 1500 ml reactor equipped with a heating jacket, agitator, reflux condenser, feed tanks and nitrogen gas inlet there is charged 241.4 g of Sample 6 and 0.741 g of tripropylene glycol diacrylate, which was commercially obtained as Sartomer 306HP.

The reactor is sparged with a constant nitrogen purge of at least 0.5 L/min for 30 minutes at room temperature. After the sparge, the kettle charge is heated to >100° C. (jacket to 120° C.). The kettle charge is held between 105-120° C. until the BA conversion is >98%.

The resulting solution polymer is then cooled to ambient temperature and discharged from the reactor. The total theoretical Mn of the polymer is 100,000 g/mol. The "soft" middle segment is 60,000 g/mol and the "hard" end segments are 40,000 g/mol each.

The measured molecular weight (Mn) of the total acrylic polymer is 36150 g/Mole (determined by gel permeation chromatography relative to polystyrene standards) and the polydispersity is 2.60.

Tables 2 and 3 summarize properties of several polymers produced in the noted examples.

TABLE 2

Properties of 100% Solids Acrylic Hot Melt (ABA type) - Polymers

| Sample | Mw | Structure | End Blocks | End Block % | Midblock | Midblock % | Mw | Mn | PDI |
|---|---|---|---|---|---|---|---|---|---|
| 2 | 100k | Triblock | 85% MMA 15% tBA | 30% | 100% BA | 70% | 147590 | 76887 | 1.92 |
| 1 | 100k | Triblock | 75% MMA 25% IBOA | 30% | 100% BA | 70% | 148480 | 68576 | 2.13 |
| 4 | 100k | Triblock | 85% MMA 15% tBA | 40% | 100% BA | 60% | 171040 | 93427 | 1.83 |
| 5 | 100k | Triblock | 85% MMA 15% tBA | 20% | 100% BA | 80% | 188070 | 84852 | 2.21 |

TABLE 3

Properties of 100% Solids Acrylic Hot Melt (ABA type)

| Sample | End Blocks | End Block % | Mid-block | Mid-block % | 180 SS Peels 15 Min. | 180 SS Peels 24 Hr. | 8.8 pounds/in² |
|---|---|---|---|---|---|---|---|
| 2 | 85% MMA; 15% IBA | 30% | 100% BA | 70% | 3.45 | 4.36 | 326 ADH |
| 1 | 75% MMA; 25% IBOA | 30% | 100% BA | 70% | 4.71 | 7.71 mix | 379 SP |
| 4 | 85% MM A; 15% tBA | 40% | 100% BA | 60% | 2.02 | 2.88 | 1450 ADH |
| 5 | 85% MM A; 15% tBA | 20% | 100% BA | 80% | 4.83 SP | 5.12 SP | 13 SP |

*Coated to 2 mil mylar at 60 gsm =/- 5 gsm

Figure 1:
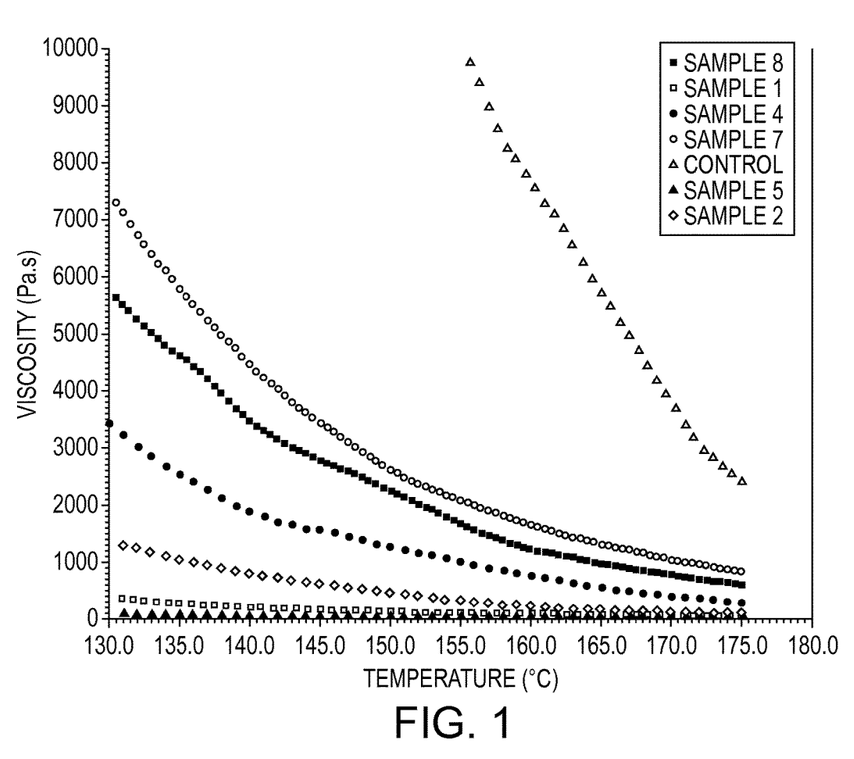
FIG. 1 is a graph of viscosity versus temperature for various acrylic block copolymers prepared in accordance with the present subject matter.
Figure 2:
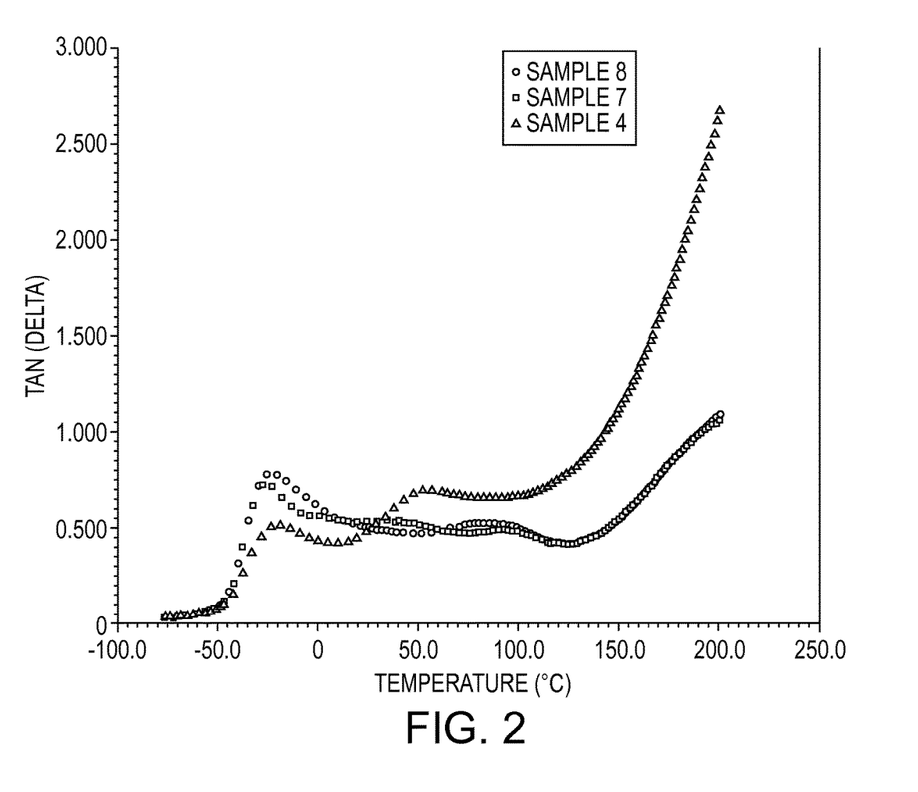
FIG. 2 is a graph of tan (delta) versus temperature for several acrylic block copolymers prepared in accordance with the present subject matter.
Figure 3:
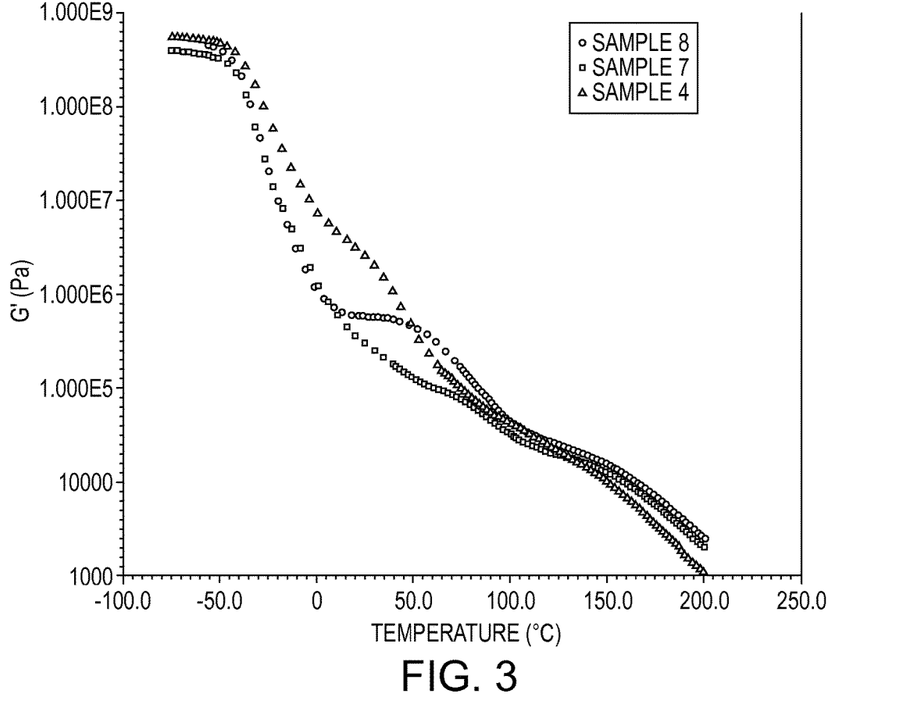
FIG. 3 is a graph of G' versus temperature for the acrylic block copolymers of FIG. 2.

FIGS. 1-3 illustrate viscosity, tan (delta), and G' properties for various samples described herein as a function of temperature.

In accordance with the present subject matter, utilizing controlled free radical polymerization it is possible to use monomers of lower purity, monomers with polar (crosslinkable) functional groups and which are more amenable with standard free radical manufacturing assets. Unique properties can be derived using the living free radical techniques because of the ability to incorporate a broad range of monomers. For example inordinately high peel adhesions with high cohesion (as measured by static shear) can be observed that represent a better balance of properties than standard pressure sensitive adhesives.

Reversible Addition/Fragmentation Chain Transfer Polymerization (RAFT) can be performed using existing solvent acrylic reactors. Stable Free Radical Polymerization (SFRP) can be performed in existing solvent acrylic reactors with some modification to be able to polymerize at higher than typical temperatures. High solids solvent adhesives could be used in existing coating lines with solvent coating capability and the hot melt varieties could be used with hot melt capabilities.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An acrylic block copolymer comprising:
   at least one A block;
   at least one B block;
   wherein the copolymer is inherently tacky at room temperature,
   the copolymer having a 180° Peel (Stainless Steel/15 minutes dwell time) adhesion of at least about 2 (lb/in) at 23° C. when tested according to PSTC-101 Method A, without addition of tackifiers,
   wherein the copolymer exhibits a polydispersity index in a range of from 1 to 4,
   wherein each of the at least one A blocks includes a minority proportion of monomers forming the B blocks and each of the at least one B blocks includes a minority proportion of monomers forming the A blocks,
   wherein the block copolymer is phase separated,
   wherein the block copolymer is an ABA structure, and
   wherein the block copolymer is solvent-based.

2. The acrylic copolymer of claim 1 wherein the copolymer has a number average molecular weight (Mn) in a range of from 25,000 to 500,000.

3. The acrylic copolymer of claim 2 wherein the copolymer has a number average molecular weight (Mn) in a range of from 50,000 to 200,000.

4. The acrylic copolymer of claim 1 wherein the copolymer exhibits a polydispersity index in a range of from 1.3 to 3.

5. The acrylic copolymer of claim 1 wherein the A block is prepared from at least one monomer selected from the group consisting of isobornyl acrylate, n-butyl acrylate, t-butyl acrylate, methyl (meth)acrylate, tripropylene glycol diacrylate, ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; caprolactone acrylate; 2-phenoxyethyl acrylate; benzyl acrylate; monomethyoxy tripropylene glycol monoacrylate; monomethoxy neopentyl glycol propoxylate monoacrylate; 1,3-butanediol diacrylate; 1,4 butanediol diacrylate; 1,6-hexanedioldiacrylate; trimethylol propane triacrylate; glyceryl triacrylate; pentaerythritol triacrylate; pentaerythritoltetraacrylate; dipentaerythritol pentaacrylate; di-trimethylolpropane tetraacrylate; tris(2-hydroxyethyl)isocyanurate triacrylate, tetrahydrofurfuryl acrylate; isooctyl acrylate; isodecyl acrylate; 2-(2-ethoxyethoxy) ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate and combinations thereof.

6. The acrylic copolymer of claim 1 wherein the B block is prepared from at least one monomer selected from the group consisting of isobornyl acrylate, n-butyl acrylate, t-butyl acrylate, methyl (meth)acrylate, tripropylene glycol diacrylate, ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; caprolactone acrylate; 2-phenoxyethyl acrylate; benzyl acrylate; monomethyoxy tripropylene glycol monoacrylate; monomethoxy neopentyl glycol propoxylate monoacrylate; 1,3-butanediol diacrylate; 1,4 butanediol diacrylate; 1,6-hexanedioldiacrylate; trimethylol propane triacrylate; glyceryl triacrylate; pentaerythritol triacrylate; pentaerythritoltetraacrylate; dipentaerythritol pentaacrylate; di-trimethylolpropane tetraacrylate; tris(2-hydroxyethyl)isocyanurate triacrylate, tetrahydrofurfuryl acrylate; isooctyl acrylate; isodecyl acrylate; 2-(2-ethoxyethoxy) ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate and combinations thereof.

7. A pressure sensitive adhesive composition comprising:
   a solvent-based acrylic block copolymer including at least one A block and at least one B block, wherein the copolymer exhibits pressure sensitive adhesive characteristics,
   wherein the copolymer exhibits a polydispersity index in a range of from 1 to 4,
   wherein each of the at least one A blocks includes a minority proportion of monomers forming the B blocks and each of the at least one B blocks includes a minority proportion of monomers forming the A blocks,
   wherein the block copolymer is phase separated,
   wherein the block copolymer is an ABA structure, and
   wherein the block copolymer is solvent-based.

8. The composition of claim 7 wherein the copolymer has a number average molecular weight (Mn) in a range of from 25,000 to 500,000.

9. The composition of claim 8 wherein the copolymer has a number average molecular weight (Mn) in a range of from 50,000 to 200,000.

10. The composition of claim 7 wherein the copolymer exhibits a polydispersity index in a range of from 1.3 to 3.

11. The composition of claim 7 wherein the A block is prepared from at least one monomer selected from the group consisting of isobornyl acrylate, n-butyl acrylate, t-butyl acrylate, methyl (meth)acrylate, tripropylene glycol diacrylate, ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; caprolactone acrylate; 2-phenoxyethyl acrylate; benzyl acrylate; monomethyoxy tripropylene glycol monoacrylate; monomethoxy neopentyl glycol propoxylate monoacrylate; 1,3-butanediol diacrylate; 1,4 butanediol diacrylate; 1,6-hexanedioldiacrylate; trimethylol propane triacrylate; glyceryl triacrylate; pentaerythritol triacrylate; pentaerythritoltetraacrylate; dipentaerythritol pentaacrylate; di-trimethylolpropane tetraacrylate; tris(2-hydroxyethyl)isocyanurate triacrylate, tetrahydrofurfuryl acrylate; isooctyl acrylate; isodecyl acrylate; 2-(2-ethoxyethoxy) ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate and combinations thereof.

12. The composition of claim 7 wherein the B block is prepared from at least one monomer selected from the group consisting of isobornyl acrylate, n-butyl acrylate, t-butyl acrylate, methyl (meth)acrylate, tripropylene glycol diacrylate, ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; caprolactone acrylate; 2-phenoxyethyl acrylate; benzyl acrylate; monomethyoxy tripropylene glycol monoacrylate; monomethoxy neopentyl glycol propoxylate monoacrylate; 1,3-butanediol diacrylate; 1,4 butanediol diacrylate; 1,6-hexanedioldiacrylate; trimethylol propane triacrylate; glyceryl triacrylate; pentaerythritol triacrylate; pentaerythritoltetraacrylate; dipentaerythritol pentaacrylate; di-trimethylolpropane tetraacrylate; tris(2-hydroxyethyl)isocyanurate triacrylate, tetrahydrofurfuryl acrylate; isooctyl acrylate; isodecyl acrylate; 2-(2-ethoxyethoxy) ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate and combinations thereof.

13. The composition of claim 7 wherein the composition is free of tackifiers.

14. The composition of claim 7 further comprising: at least one tackifier.

15. The composition of claim 7 further comprising an agent selected from the group consisting of plasticizers, oils, processing aids, antioxidants, stabilizers, fillers, dyes, pigments, rheological additives, and combinations thereof.

16. The acrylic copolymer of claim 1, wherein the at least one A block is a hard block and the at least one B block is a soft block.

17. The acrylic copolymer of claim 1 wherein the B block comprises at least one acrylate midblock monomer and the A blocks comprises at least two acrylate endblock monomers.

18. The acrylic copolymer of claim 1, wherein the acrylic copolymer includes a transition region between A blocks and B blocks in which the population of each of the minority proportions increases or decreases along the backbone of the acrylic block copolymer.

19. The acrylic copolymer of claim 1 wherein the monomer conversion extent is 80% to 95%.

20. The acrylic copolymer of claim 1 wherein the distribution of the minority proportion of monomers in a block of another monomer type is not uniform, but varies along the length of the block.

21. The acrylic copolymer of claim 2 wherein the number average molecular weight of the A block represents from about 5% to about 60% of the total molecular weight of the polymer.

22. The acrylic copolymer of claim 21 wherein the number average molecular weight of the A block represents from about 10% to about 50% of the total molecular weight of the polymer.

23. The acrylic copolymer of claim 2 wherein the number average molecular weight of the B block represents from about 40% to about 95% of the total molecular weight of the polymer.

24. The acrylic copolymer of claim 23 wherein the number average molecular weight of the B block represents from about 50% to about 90% of the total molecular weight of the polymer.

25. The composition of claim 7 wherein the copolymer is inherently tacky at room temperature, the copolymer having a 180° Peel (Stainless Steel/15 minutes dwell time) adhesion of at least about 2 (lb/in) at 23° C. when tested according to PSTC-101 Method A, without addition of tackifiers and/or subsequent processing.

* * * * *